United States Patent
Yu et al.

(10) Patent No.: US 9,665,496 B2
(45) Date of Patent: May 30, 2017

(54) NON-VOLATILE MEMORY WRITE MECHANISM

(71) Applicant: Hewlett-Packard Development Company, L.P., Houston, TX (US)

(72) Inventors: XinLai Yu, Beijing (CN); Terry Ping-Chung Lee, Antelope, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/763,996

(22) PCT Filed: Jan. 30, 2013

(86) PCT No.: PCT/CN2013/071104
§ 371 (c)(1),
(2) Date: Jul. 28, 2015

(87) PCT Pub. No.: WO2014/117328
PCT Pub. Date: Aug. 7, 2014

(65) Prior Publication Data
US 2015/0363323 A1    Dec. 17, 2015

(51) Int. Cl.
*G06F 3/06* (2006.01)
*G06F 12/02* (2006.01)
(Continued)

(52) U.S. Cl.
CPC ........ *G06F 12/0891* (2013.01); *G06F 3/0619* (2013.01); *G06F 3/0656* (2013.01);
(Continued)

(58) Field of Classification Search
CPC ............. G06F 12/0246; G06F 12/0891; G06F 3/0619; G06F 3/0656; G06F 3/0679;
(Continued)

(56) References Cited

U.S. PATENT DOCUMENTS

| 4,800,520 A | 1/1989 | Iijima |
| 6,249,793 B1 | 6/2001 | Printezis et al. |

(Continued)

FOREIGN PATENT DOCUMENTS

| CN | 1732516 A | 2/2006 |
| JP | 3045083 | 5/2000 |

(Continued)

OTHER PUBLICATIONS

PCT/ISA/CN, International Search Report, mailed Jul. 25, 2013, PCT/CN2013/071104, 10 pps.

(Continued)

*Primary Examiner* — Aracelis Ruiz
(74) *Attorney, Agent, or Firm* — Dhand Law PC (57) ABSTRACT

A system includes a memory buffer to cache a non-volatile memory. The non-volatile memory stores a plurality of valid and obsolete variables in a plurality of valid and obsolete regions, respectively. The system further includes a journal region to track movement of valid variables and valid regions within the memory buffer utilizing alternating pairs of structure pointers to indicate at least portions of the plurality of valid and obsolete regions indicative of from where and to where the valid variables move during a write event.

15 Claims, 4 Drawing Sheets

(51) Int. Cl.
*G06F 12/08* (2016.01)
*G06F 12/0891* (2016.01)
*G06F 9/445* (2006.01)

(52) U.S. Cl.
CPC .............. *G06F 3/0679* (2013.01); *G06F 8/65* (2013.01); *G06F 12/0246* (2013.01); *G06F 2212/1032* (2013.01); *G06F 2212/202* (2013.01); *G06F 2212/69* (2013.01); *G06F 2212/7205* (2013.01)

(58) Field of Classification Search
CPC ........... G06F 2212/69; G06F 2212/202; G06F 2212/1032; G06F 2212/7205
See application file for complete search history.

(56) References Cited

U.S. PATENT DOCUMENTS

| | | | |
|---|---|---|---|
| 6,795,890 B1 * | 9/2004 | Sugai | G11C 16/102 365/185.29 |
| 7,072,211 B2 | 7/2006 | Newell | |
| 7,299,314 B2 | 11/2007 | Lin et al. | |
| 7,451,265 B2 | 11/2008 | Traister et al. | |
| 7,809,975 B2 | 10/2010 | French et al. | |
| 8,156,303 B2 | 4/2012 | Barrall | |
| 8,260,818 B1 | 9/2012 | Polydov | |
| 8,448,034 B2 | 5/2013 | Asano | |
| 8,621,143 B2 | 12/2013 | Purdy | |
| 8,825,937 B2 | 9/2014 | Atkisson | |
| 2006/0085493 A1 | 4/2006 | Kim | |
| 2006/0112222 A1 | 5/2006 | Barrall | |
| 2011/0055455 A1 | 3/2011 | Post et al. | |
| 2012/0191936 A1 | 7/2012 | Ebsen et al. | |
| 2012/0265924 A1 | 10/2012 | Purdy et al. | |
| 2014/0258588 A1 | 9/2014 | Tomlin | |

FOREIGN PATENT DOCUMENTS

| | | |
|---|---|---|
| TW | 200742977 | 11/2007 |
| TW | I292867 | 1/2008 |
| TW | I344083 | 6/2011 |
| TW | I352312 | 11/2011 |
| WO | WO-2014117328 A1 | 8/2014 |

OTHER PUBLICATIONS

Phoenix; Phoenix Developer Network; http://blogs.phoenix.com/phoenix_technologies_bios/uefi/page/3/>; Feb. 2, 2007.

Umesh Maheshwari, "Fault-Tolerant Distributed Garbage Collection in a Client-Server Object-Oriented Database," Jul. 2, 1999, <http://www.pmg.lcs.mit.edu/papers/dgc.pdf>.

Related Application PCT/CN2015/071461, filed Jan. 23, 2015, 42 pps.

\* cited by examiner

NON-VOLATILE MEMORY WRITE MECHANISM

BACKGROUND

Hardware components used in computing devices, such as, e.g., desktop computers, laptop computers, tablet computers, etc., often include firmware, which can refer to a combination of hardware and executable instructions that control low-level functionality of the hardware components. That is, firmware may enable proper operation of a computing device by allowing for the interaction between hardware components installed in a computing device. As an example, a hard drive can include firmware that configures the hard drive upon power-up, interprets and executes instructions from a processor, and safely powers down the hard drive.

Unified Extensible Firmware Interface (UEFI) refers to a specification (managed by the Unified EFI Forum) that defines a software interface between an operating system and platform firmware. UEFI is meant as a replacement for the Basic Input/Output System (BIOS) firmware interface. That is, an while BIOS may be thought of as a fundamentally solid piece of firmware, UEFI may be thought of as a programmable software interface that sits on top of a computing device's hardware and firmware (i.e., UEFI can and does sit on top of BIOS). Rather than all boot code being stored in a motherboard's BIOS, UEFI can sit in an EFI/ directory in some non-volatile memory, e.g., on the motherboard, on a hard drive, or on a network share. In other words, EFI software can be loaded from firmware, e.g., flash memory, upon system start up. Once loaded, it can take control of the boot process. As a result, UEFI can be thought to resemble a lightweight or pseudo-operating system (OS).

BRIEF DESCRIPTION OF THE DRAWINGS

For a more complete understanding of various examples, reference is now made to the following descriptions taken in connection with the accompanying drawings in which.

DETAILED DESCRIPTION

Figure 1:
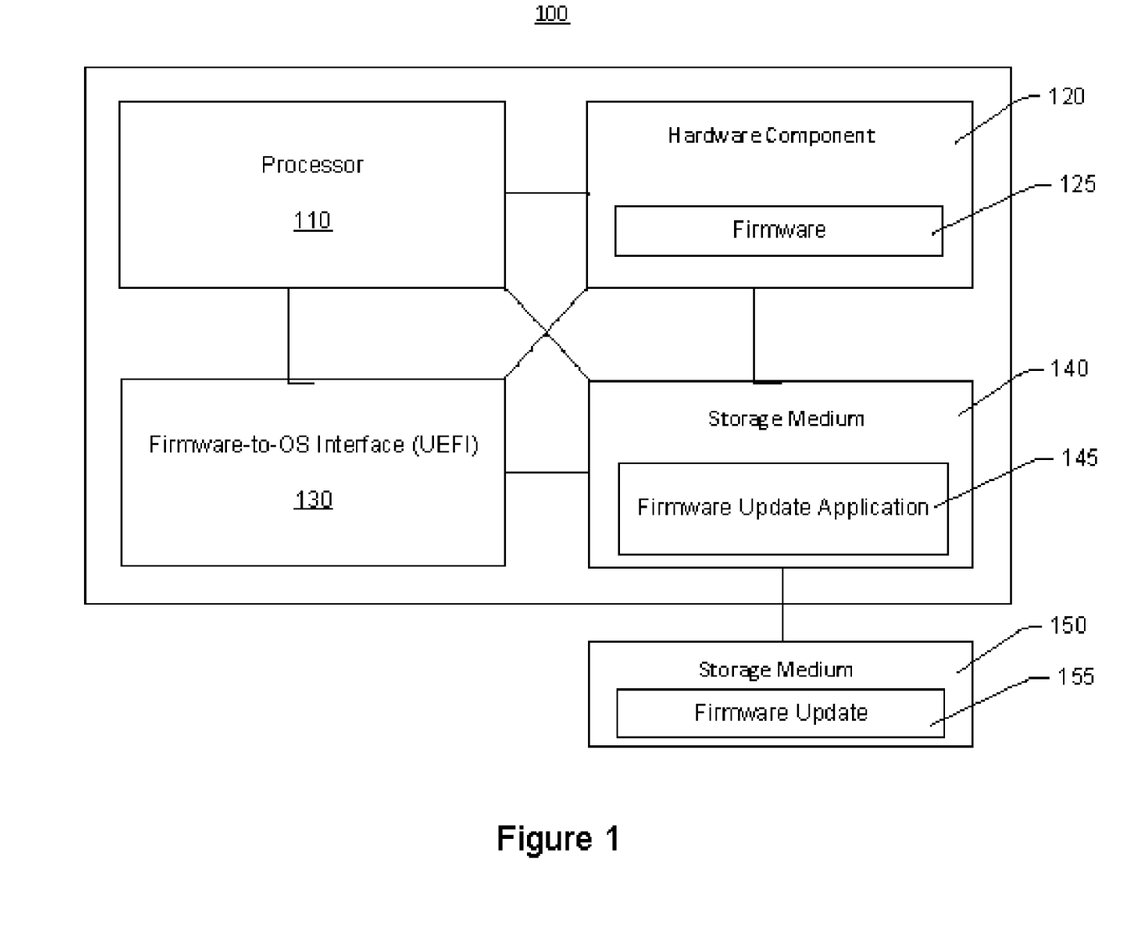
FIG. 1 illustrates an example system in which a non-volatile fault tolerant write mechanism may be utilized.

FIG. 1 is a block diagram of an example computing device 100 including a computer-readable storage medium 140 that can be encoded with instructions for executing a firmware update application 145. It should be noted that the firmware update application 145/firm updating is merely an example application/context in which a non-volatile fault tolerant write mechanism may be implemented, and that a variety of other firmware applications/contexts are contemplated. Computing device 100 may be, for example, a desktop computer, a laptop computer, a server, a handheld computing device, or the like. Computing device 100 may include a processor 110, a hardware component 120, a firmware-to-OS interface 130, and computer-readable storage media 140 and 150.

Processor 110 may be a central processing unit (CPU), a semiconductor-based microprocessor, or any other hardware device suitable for retrieval and execution of instructions stored in computer-readable storage media 140 and/or 150. In particular, processor 110 may fetch, decode, and execute firmware update application 145 and firmware update 155.

Hardware component 120 may be any physical device including mechanical, magnetic, electronic, and/or electrical parts used to implement functionalities of computing device 100. For example, hardware component 120 may be a hard disk drive, a solid state drive, an optical disk drive, a video or network card, a laptop battery, or any other physical device internally or externally coupled to computing device 100. It should be noted that although illustrated as including only one hardware component 120, computing device 100 may include a plurality of hardware components 120, each including their own firmware 125.

Each hardware component 120 may include firmware 125, which may include a non-volatile machine-readable storage medium encoded with instructions executable by processor 110 or a processor included in the hardware component 120 (not shown) itself to control the functionality of the hardware component 120. For example, firmware 125 may provide functions to read from or write to hardware component 120, to manage the power of hardware component 120, and/or to perform one or more other functions used during operation of hardware component 120.

Firmware-to-OS interface 130 may comprise executable instructions encoded on a computer-readable readable storage medium for providing a functional link between firmware 125 of hardware component 120 and the OS of computing device 100. In particular, and upon power-up of computing device 100, firmware-to-OS interface 130 may execute a series of instructions to initialize, configure, and test hardware component 120, and to load the OS. In addition, firmware-to-OS interface 130 may initiate firmware update application 145 to update firmware 125 included on hardware component 120. As an example, firmware-to-OS interface 130 may detect that a firmware update 155 is available, and may then initiate firmware update application 145 from a predetermined location.

In accordance with various examples, firmware-to-OS interface 130 may be an interface implemented in accordance with the UEFI specification (as previously alluded to) for providing services to initialize computing device 100. As another example, firmware-to-OS interface 130 may be a UEFI interface implemented in conjunction with a BIOS (as also previously alluded to) such that the BIOS can perform an initial configuration (e.g., a Power-On Self Test) while the UEFI interface may perform the remaining configuration and communicate with the OS.

Computer-readable storage medium 140 may be encoded with executable instructions for running a firmware update application 145. As described above, firmware update application 145 may be initiated by firmware-to-OS interface 130 to manage the firmware update process. In some examples, upon initialization, firmware update application 145 may locate a firmware update 155, and then execute firmware update 155. For example, firmware update application 145 may be supplied by a manufacturer of computing device 100, e.g., included in a hard disk drive or storage medium during manufacturing or customization, such that computing device 100 may natively support the installation of firmware updates. Alternatively, an application running on computing device 100 may download firmware update application 145 to storage medium 140, either automatically or at the direction of the user.

Computer-readable storage medium 150 may be encoded with executable instructions for applying firmware update 155 to firmware 125 of hardware component 120. For example, firmware update 155 may include instructions that access and modify the storage medium containing firmware 125 using instructions supported by the controller of hardware component 120. As a more specific example, when hardware component 120 is a hard disk drive, firmware update 155 may include instructions accepted by the hard disk drive to write to a specified section of the firmware image stored on a ROM or similar memory in the hard disk. In this manner, firmware update 155 may handle all accesses to firmware 125, while firmware update application 145 may manage the update process.

It should be noted that, although illustrated as external to computing device 100, computer-readable storage medium 150 may also be internal to computing device 100. Thus, firmware update 155 may be stored on an internal hard disk drive, an optical disk, or another storage medium. Furthermore, although illustrated as separate devices, computer-readable storage medium 140 and computer-readable storage medium 150 may be the same medium, either internal or external to computing device 100. For example, firmware update application 145 and firmware update 155 may both be stored on an external storage medium, such as a flash memory drive or optical disk, such that firmware update application 145 and firmware update 155 may be launched from the external storage medium. Such examples are advantageous, for example, in environments in which the same update will be installed on multiple computing devices 100 (e.g., by a network administrator) or in situations where firmware update application 145 is unable to launch from an internal storage medium of computing device 100.

In terms of storage, software asset/management data/images may be stored as firmware variables using extensions to traditional firmware functionality in accordance with the UEFI specification. That is, UEFI can provide an abstraction for storing persistent data in platform firmware known as "variables." Variables may be defined as key/value pairs that include both identifying information along with attributes (the key), and arbitrary data (the value). Variables can be utilized to store data that may pass between an EFI environment implemented in a platform and EFI OS loaders and other applications that run in the EFI environment, including passing variables to OS run-time entities (such as in the context of a firmware update as described above). Although the implementation of variable storage is not defined in the UEFI specification, variables must usually be persistent in most cases, implying that the EFI implementation on a platform should allow for variables passed in for storage to be retained and available for use each time the system boots, at least until they are explicitly deleted or overwritten.

In accordance with the UEFI specification, a variable service may supply a common/standard interface for data exchange between the OS and system firmware (SFW) (i.e., BIOS). As such, variable services may persist into OS runtime, and therefore, the variable services API can be exposed to the OS, enabling variable data to be added, modified, and deleted by OS actions during OS runtime, in addition to firmware actions during, e.g., pre-boot operations. Generally, variable data may be stored in a system's boot firmware device (BFD), which can be some form of rewritable non-volatile memory component, such as, but not limited to, a flash device or electrically erasable programmable read-only memory (EEPROM). Such non-volatile memory components, generally referred to as non-volatile (NV) rewritable memory devices, can refer to any device capable of storing data in a non-volatile manner (i.e., persisting) when the system is not actually operational, while providing both read and write access to the stored data. Thus, all or a portion of firmware stored on an NV rewritable memory device may be updated by rewriting data to appropriate memory ranges defined for the device.

Accordingly, a portion of the BFD's (or an auxiliary firmware storage device's) memory space may be reserved for storing persistent data, including variable data. In the case of flash and similar devices, this portion of memory can be referred to as NV random access memory (NVRAM). NVRAM can behave in a manner similar to conventional RAM, except that under flash storage schemes, individual bits may only be toggled in one direction. As a result, in order to reset a toggled bit, groups of bits are "erased" on a block-wise basis.

As discussed above, under UEFI, variables are defined as key/value pairs that consist of identifying information plus attributes (the key) and arbitrary data (the value). These key/value pairs may be stored in and accessed from NVRAM via the variable services, which may include three variable service functions: GetVariable; GetNextVariableName; and SetVariable. GetVariable can return the value of a variable. GetNextVariableName can enumerate the current variable names. SetVariable may set the value of a variable. Each of the GetVariable and SetVariable functions may employ five parameters: VariableName, VendorGuid (a unique identifier for the vendor); Attributes (via an attribute mask); DataSize; and Data. The Data parameter can identify a buffer (via a memory address) to write or read the data contents of the variable from. The VariableName and VendorGuid parameters can enable variables corresponding to a particular hardware component (e.g., add-in card) to be easily identified, and enable multiple variables to be attached to the same hardware component.

In particular, and in a typical UEFI variable service implementation, UEFI variables may be stored in storage continuously such that when an update to an existing UEFI variable is made, the existing value is not directly modified. Rather, the existing UEFI variable is simply tagged as "DELETED" in a variable header, while a new UEFI variable may then be created, where the new UEFI variable may be tagged as "ADDED" in a corresponding variable header. A similar procedure may be utilized to delete an existing UEFI variable. That is, an existing UEFI variable may be tagged as "DELETED," while still maintaining the content associated with the UEFI variable in storage. Accordingly, and depending on the size/amount of memory available for storage, eventually, enough variable create/delete/update/edit/add actions will result in a need to clear out variables that are no longer needed/valid, i.e., those variables that have been tagged as DELETED. To clear out the variables that have been tagged as DELETED, a garbage collection process may be implemented.

It should be noted that garbage collection for a UEFI variable stored in NVRAM should be performed in a fault tolerant write manner. That is, and in the event that a system crash, e.g., power failure, occurs while garbage collection is in progress, no UEFI variable data loss should occur. Additionally, if garbage collection is triggered by, e.g., the updating of an existing variable, and a system crash occurs during such garbage collection, the requested (updated) UEFI variable should retain/remain associated with its previous value or updated value after the system recovers from the system crash.

In accordance with conventional garbage collection for UEFI variables, spare NVRAM regions are used to ensure a fault tolerant write mechanism. For example, assuming Region A refers to a target UEFI variable NVRAM region on which garbage collection is to be performed, Region B may be assumed to be the spare NVRAM region. Additionally, another NVRAM region, e.g., Region C may be assumed to be a small NVRAM region used for recording journals during garbage collection. Yet another NVRAM region, Region D, may be assumed to be a global memory buffer that is utilized to cache Region A UEFI variable data. Still other NVRAM regions, e.g., Region E and Region F may be assumed to be two local temporary memory buffers for garbage collection.

It should be noted that Region D may refer to a global cache, and when a UEFI variable is read through the GetVariable service, data may be retrieved from the global memory buffer (Region D) directly. Doing so speeds up read access time as performing a memory read is typically faster than reading NVRAM, in this example, Region A. It should be further noted that, generally, before garbage collection begins on a target UEFI variable NVRAM region, such as Region A, the global memory buffer/cache (Region D) has already cached the entirety (all the stored data) of Region A.

For example, and in accordance with a conventional garbage collection process, a new fault tolerant write event may be recorded in Region C. Thereafter, any variables tagged as "ADDED" may be read from Region A to Region E, and any variables tagged as "DELETED" may be dropped, resulting in Region E having all valid variables. The data contained in Region E may then be written to Region B. After the write completes, the record/journal corresponding to the new fault tolerant write event previously created in Region C may be tagged as, e.g., "spare region update complete." All of the data contained in Region B may then be read into Region F, and the data in Region F may be written back to Region A. After this write completes, the record/journal in Region C corresponding to the fault tolerant write event (last tagged as Spare region update complete) may be updated and tagged as, e.g., "target region update complete." At this point, Region A may be thought of as having been "garbage collected," and the fault tolerant write event created in Region C may be updated yet again and tagged as, e.g., "event complete." Accordingly, all of the data may be read from Region A to Region D, such that Region D may then be considered to have the latest valid variables (i.e., cache of Region A).

In accordance with such a conventional fault tolerant write scheme, it can be seen that an additional spare NVRAM region (e.g., Region B) is utilized to ensure a fault tolerant write event. Accordingly, at any time, if a system crash occurs during garbage collection, there may be a valid UEFI variable region copy (either in Region A or Region B). Hence, after a system reboot, the SFW (BIOS) can resume the interrupted fault tolerant write event by checking the recorded journals kept in Region C.

Given that the aforementioned conventional fault tolerant write scheme is assumed to applicable for a block device (e.g. flash-based memory), the write to be performed should be a block write (with a block erase prior to each block write). However, and as discussed, a spare NVRAM region is utilized to ensure that a redundant copy of data exists, and therefore, in certain instances, can result in double-sizing NVRAM storage. For example, if there are 600 k bytes of NVRAM UEFI variables at issue, a platform utilizing conventional fault tolerant write mechanisms equip at least 1200 k bytes of NVRAM storage on hardware to accommodate garbage collection. Accordingly, utilizing NVRAM storage (e.g., battery-backed static RAM (SRAM) can increase system cost. Additionally, frequent performance of NVRAM storage reading with bulk data during a fault tolerant write scheme can increase garbage collection execution time, making its use in time-sensitive scenarios less desirable, e.g., garbage collection at runtime in OS in system management mode (SMM). Further still, utilizing redundant NVRAM storage can result in space penalties because storage needs for accommodating doubled (tripled or even more) memory must be met.

Accordingly, various examples provide a fault tolerant write mechanism for a UEFI platform to perform garbage collection of UEFI variables on NVRAM storage which need not rely on redundant storage space. That is, the need for a large sized NVRAM storage/device is lessened or negated, while also improves garbage collection performance.

In many UEFI platforms, RAM-type NVRAM storage (e.g., battery-backed SRAM) is utilized as UEFI variable storage. Because RAM-type NVRAM storage has no block-erase limitation, it can be used flexibly like RAM. Various examples leverage this attribute of RAM-type NVRAM storage by performing garbage collection in a fault tolerant write manner.

Figure 2A:
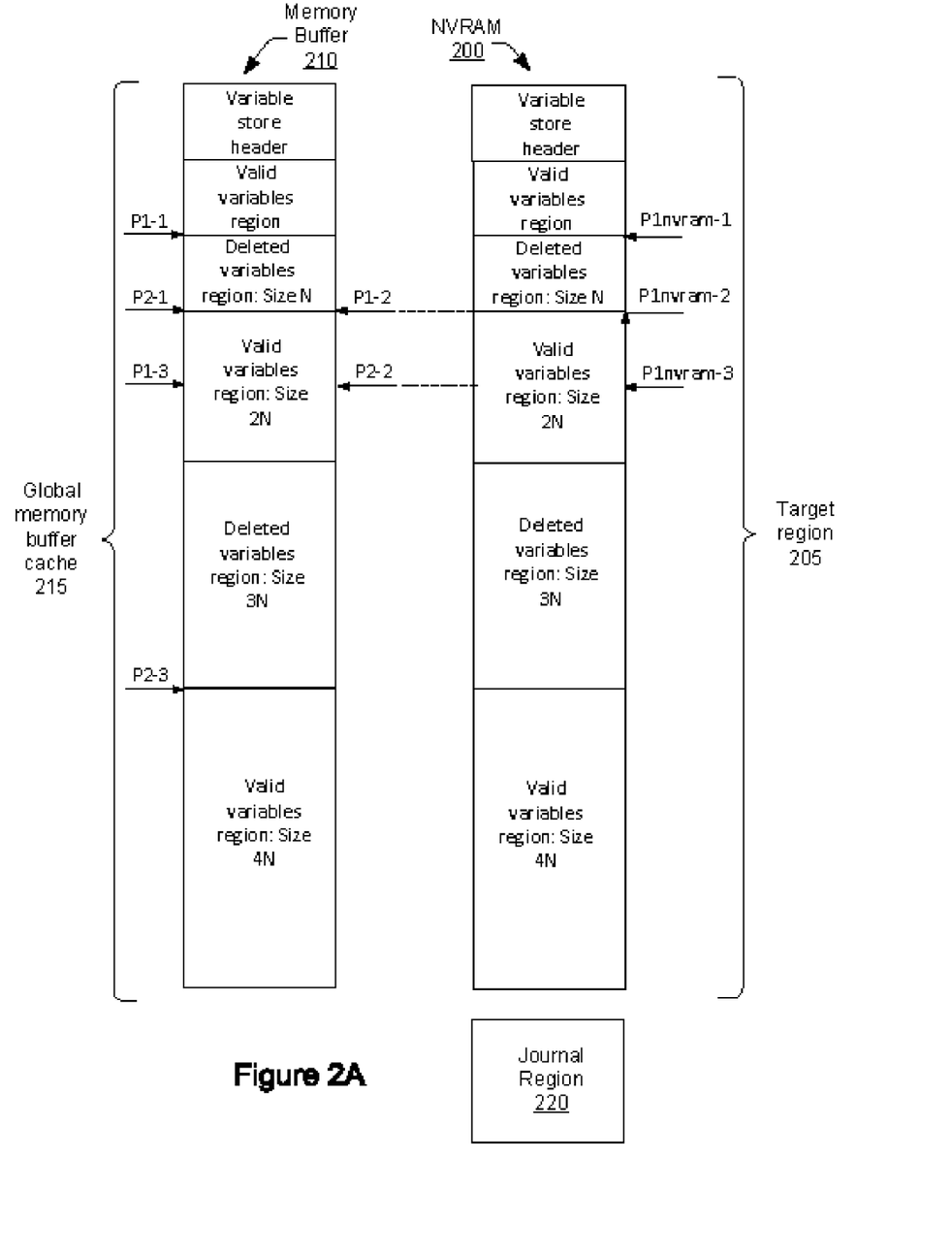
FIG. 2A illustrates an example UEFI platform in which a non-volatile fault tolerant write mechanism may be implemented.
Figure 2B:
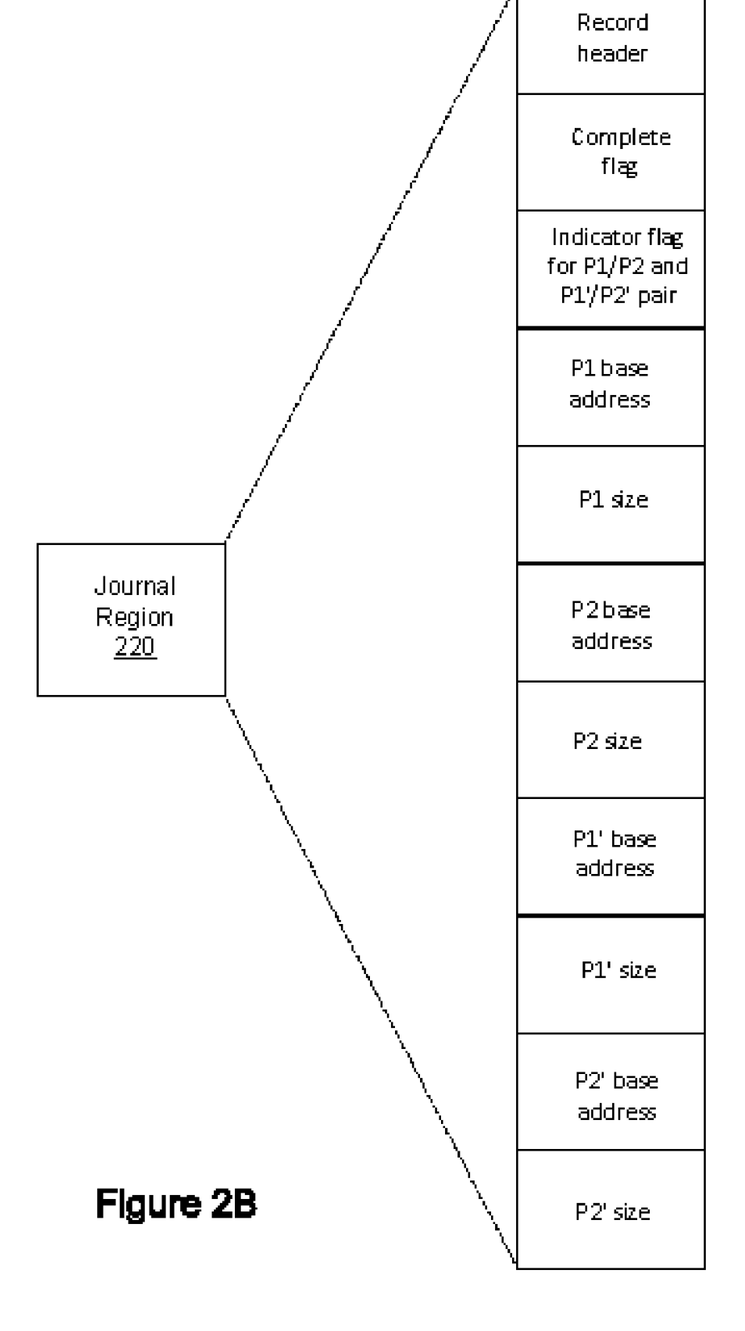
FIG. 2B illustrates an example journal region for tracking data movement in accordance with a non-volatile fault tolerant write mechanism.

FIGS. 2A and 2B illustrate an example UEFI platform in which garbage collection may be performed as part of an non-volatile memory (e.g., NVRAM) fault tolerant write mechanism. As illustrated in FIG. 2A, target region 205 may refer to a target UEFI variable region in NVRAM storage (i.e., NVRAM 200) that requires garbage collection. As also illustrated in FIG. 2A, a global memory buffer cache 215 may refer to a global memory cache of target region 205 within memory buffer 210.

It should be noted that the target region 205 and the global memory buffer cache 215 can be the same size and contain identical data (where caching the data stored within the target region 205 in the global memory buffer cache 215 may be performed in a separate process). That is, target region 205 and global memory buffer cache 215 may both have the following data and regions in which data is stored: a variable store header; a valid variables region; a first deleted variables region of size N; a second valid variables region of size 2N; a second deleted variables region of size 3N; and a third valid variables region of size 4N. Moreover, global memory buffer cache 215 may be thought of as an "in memory" copy of the target region 205 (i.e., the actual NVRAM storage). Further still, journal region 220 may refer to a "small" NVRAM region within NVRAM 200 allocated for recording journals during garbage collection.

In the journal region 220, a fault tolerant write event record may be created, and global memory buffer cache 215 may be searched to determine a location of the first deleted variables region (e.g., the first deleted variables region may contain a plurality of continuous deleted variables as result of prior edit, write, delete, add, etc. actions). In accordance with the example of FIG. 2A, the first deleted variables region may be determined as being pointed to by a structure pointer denoted as P1. Additionally, the next valid variables region following the first deleted variables region may be denoted by structure pointer P2. For ease of reference in describing various examples, the structure pointer pairs P1 and P2 may be distinguished with "-1," "-2," "-3," etc., as a way of denoting P1/P2 pairs. For example, a first P1/P2 pair may be denoted as P1-1 and P2-1, a second P1/P2 pair may be denoted as P1-2 and P2-2, and so on.

Once the P1 and P2 values are known, the P1 and P2 values may be recorded in the journal region 220. That is, and as illustrated in FIG. 2B, the journal region 220 may store a base address and size associated with the region pointed to by the structure pointers P1 and P2 (as well as P1' and P2', which will be discussed in greater detail below). Size N data within the second valid variables region (in this example, one half of the size 2N region) and pointed to by structure pointer P2-1 may be written from the global buffer cache 210 directly to a corresponding region in target region 205 (e.g., P1nvram-1). Size N data pointed to by structure pointer P2-1 may also be written to a memory address pointed to by structure pointer P1-1 to update memory buffer 210 accordingly. That is, valid variable data has been moved "up" within the global memory buffer cache 215 (and correspondingly within the target region 205) to an available memory space (once occupied by unneeded/obsolete data, i.e., variables tagged as DELETED), where a P1/P2 pair can be utilized to indicate "to where" and "from where," data is being moved.

The second P1/P2 pair may be formed (and recorded in journal region 220) for a subsequent round of updating, and the aforementioned process may be repeated. That is, P1-2 and P2-2 may denote a subsequent writing of data (i.e., the remaining valid variables originally stored in the size 2N region of global memory buffer cache 215) to a region pointed to by structure pointer P1nvram-2. Additionally, and to update the memory buffer 210, that same data may be "moved up" to the region formerly occupied by the first half of valid variables originally stored in the size 2N region, denoted by structure pointer P2-1.

The global memory buffer cache 215 may be searched yet again for another set of valid variables, where a third P1/P2 pair (e.g., P1-3 and P2-3) may be formed (and recorded in journal region 220) for a third round of updating. Following a similar procedure as described above, data stored within the size 4N valid variables region (and pointed to by structure pointer P2-3) may be written to a memory address pointed to by structure pointer P1nvram-3 in the target region 205 of NVRAM 200. To update the memory buffer 210, that data stored within the size 4N valid variables region (and pointed to by structure pointer P2-3) may be moved up to a memory address pointed to by structure pointer P1-3.

Furthermore, the valid variables region size 4N may be "erased," and the "Complete flag" field/section of the journal record 220 may be updated to indicate a "Completed" status. It should be noted that the above processes may be repeated.

It should be noted that in the above-described example, the valid and deleted variables regions were indicated as having sizes N, 2N, 3N and 4N merely for ease of discussion. That is, and when performing data moves in accordance with various examples, region size associated with regions pointed to by a P1/P2 record pair may be compared as follows. If a region pointed to by a structure pointer P1 has a size that is greater than or equal to a region pointed by a structure pointer P2, data having a size and base address commensurate with the P2 (or P2') size and P2 (or P2') base address recorded in journal region 220, and the global memory buffer cache 215 may be searched to form a subsequent P1/P2 record pair. Alternatively, and if a region pointed to by the structure pointer P1 has a size less than a region pointed to by the structure pointer P2, the data move would entail moving the size of data indicated by P1 (or P1') size recorded in journal region 220 to a memory address pointed to by the P2 (or P2') base address recorded in journal region 220.

As a result and when data is moved in a "piece-by-piece" approach, as has been described herein in accordance with various examples, both the target region 205 and the global memory buffer cache 215 contain "garbage collected" UEFI variables, and reserving a redundant or spare NVRAM region in NVRAM storage is unnecessary. Additionally, the global memory buffer cache 215 may be utilized to search for data, as well as data movement, thereby negating a need for bulk NVRAM data reading from NV RAM storage (in particular, target region 205 of NVRAM 200), and improving garbage collection performance. Thus, various examples may be utilized time-sensitive scenarios.

Additionally, journal region 220 maintains a latest valid P1/P2 pair and allows for resuming an interrupted garbage collection procedure without the loss of data. That is, and as alluded to previously, the journal region 220 may maintain a record of the P1/P2 base addresses and sizes, as well as P1'/P2' base addresses and sizes. P1' and P2' can refer to a second record pair that may be recorded/updated in a "toggled" fashion along with the P1 and P2 record pair. That is, and in accordance with, e.g., a first round of updating (as previously described), the relevant P1/P2 record pair (e.g., P1-1 and P2-1) may be maintained using the P1 and P2 base addresses and sizes. For a second round of updating (as also previously described), the relevant. P1/P2 record pair (e.g., P1-2 and P2-2) may be maintained using the P1' and P2' base addresses and sizes. Hence, maintenance and updating of the relevant P1/P2 record pairs may be toggled between the P1/P2 and P1'/P2' record pairs, where an indicator flag maintained within the journal region 220 may be utilized to indicate which of the record pairs (either P1/P2 or P1'/P2') is considered to be valid. Following an interruption in the garbage collection process, the valid record pair may be checked to determine how data movement should progress.

Utilizing two record pairs in this manner, in accordance with various examples, allows a valid record pair to be maintained in the journal region 220 anytime there is an interruption during garbage collection, e.g., due to power failure, which indicates where/at what point in a particular data move the interruption occurred. Moreover, and in furtherance of the aforementioned savings in storage space, the amount of data being stored and/or the size of storage can be considered irrelevant in that the tracking of data movement merely involves tracking P1/P2 and P1'/P2' record pairs, while the journal region 220 keeps track of the relevant size and base address information rather than having to accommodate actual sizes of variable regions.

Figure 3:
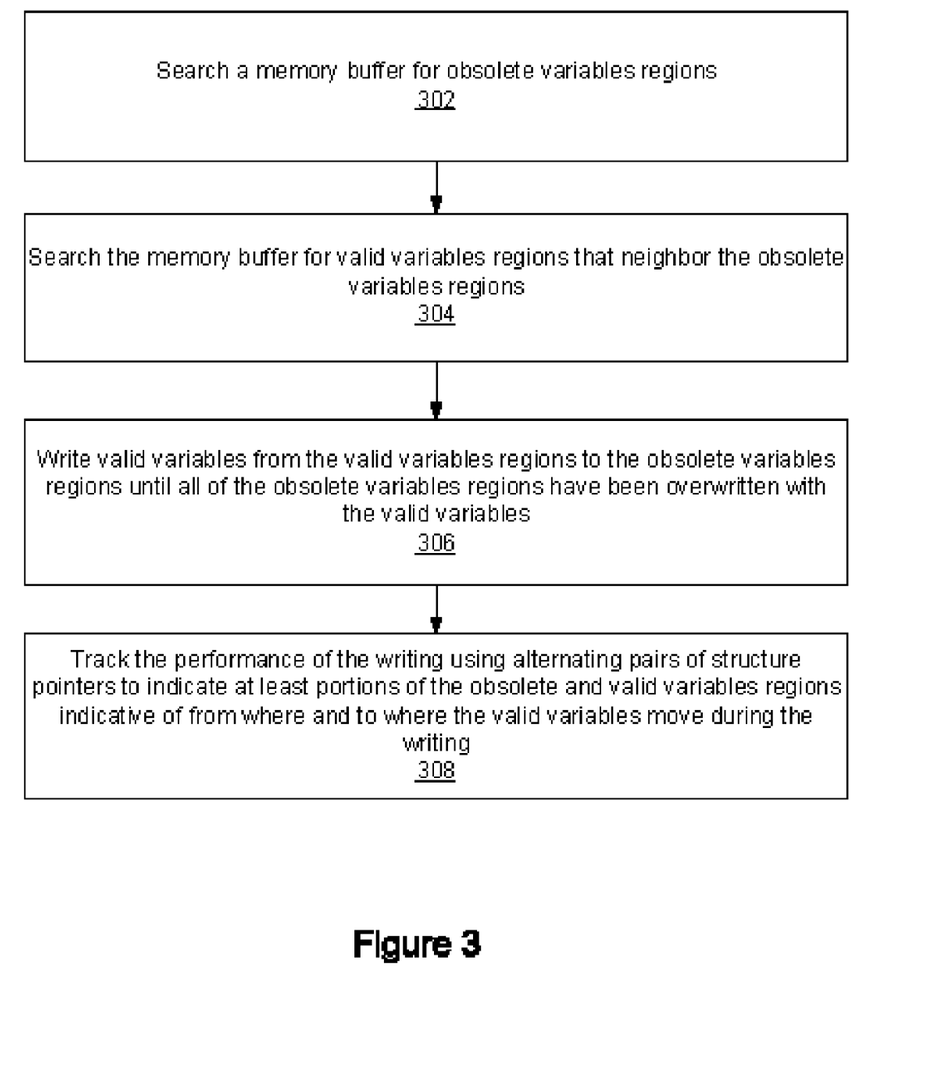
FIG. 3 illustrates example processes performed in executing a non-volatile fault tolerant write event.

FIG. 3 is a flow chart illustrating processes performed when executing an example non-volatile fault tolerant write event. A memory buffer is searched for obsolete variables regions (block 302). Moreover, the memory buffer is searched for valid variables regions that neighbor the obsolete variables regions. As noted above, the memory buffer may act as a cache for a non-volatile memory, and regions within the memory buffer that contain obsolete or DELETED variables may be overwritten with valid variables stored in valid variables. The valid variables are written from the valid variables regions to the obsolete variables regions until all of the obsolete variables regions have been overwritten with the valid variables (block 306). As also noted above, the manner in which the obsolete variables regions may be overwritten can occur in, e.g., a top-to-bottom manner, working through all of the obsolete and valid variables regions until the memory buffer (and the non-volatile memory) have been garbage collected, i.e., only the valid variables are left in the memory buffer and the non-volatile memory. Further still, the performance of the writing is tracked using alternating pairs of structure pointers to indicate at least portions of the obsolete and valid variables regions indicative of from where and to where the valid variables move during the writing (block 308). For example, and as described previously, alternating structure pointer pairs (e.g., P1/P2 and P1'/P2' record pairs) may be used to record how the valid variables move within the memory buffer and the non-volatile memory so that fault tolerant operation (e.g., interrupted garbage collection/write events) may be achieved.

While various examples have been described above in the context of certain memory architectures and processes sequences, it should be understood that they have been presented by way of example only, and not of limitation. For example, the systems and methods described herein may be applied using, e.g., multiple alternating record pairs for tracking data movement, rather than merely one alternating record pair. Additionally, and although various examples have been described as operating from a "top-to-bottom" progression through memory, a "bottom-to-top" progression may be utilized. Further still, it should be noted that the type of memory to which the fault tolerant write mechanism may be applied may not necessarily be limited to the aforementioned NVRAM storage, but to any storage that does not require block erasure of data.

Likewise, the various diagrams may depict an example architectural or other configuration for the various examples, which is done to aid in understanding the features and functionality that can be included in examples. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various examples. Also, a multitude of different constituent module names other than those depicted herein can be applied to the various partitions. Additionally, with regard to flow diagrams, operational descriptions and method claims, the order in which the steps are presented herein shall not mandate that various examples be implemented to perform the recited functionality in the same order unless the context dictates otherwise.

It should be understood that the various features, aspects and/or functionality described in one or more of the individual examples are not limited in their applicability to the particular example with which they are described, but instead can be applied, alone or in various combinations, to one or more of the other examples, whether or not such examples are described and whether or not such features, aspects and/or functionality are presented as being a part of a described example. Thus, the breadth and scope of the present disclosure should not be limited by any of the above-described exemplary examples.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

Moreover, various examples described herein are described in the general context of method steps or processes, which may be implemented in one example by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more examples. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the various examples are implemented in whole or in part using software, in one example, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
a memory buffer to cache a non-volatile memory, the non-volatile memory storing a plurality of valid and obsolete variables in a plurality of valid and obsolete regions, respectively; and
a journal region to track movement of valid variables within the memory buffer utilizing alternating pairs of structure pointers to indicate at least portions of the plurality of valid and obsolete regions indicative of from where and to where the valid variables move during a write event.

2. The system of claim 1, wherein the memory buffer moves the valid variables within the valid regions to obsolete regions containing the obsolete variables, thereby overwriting the obsolete variables with the valid variables.

3. The system of claim 1, wherein the journal region comprises a reserved region within the non-volatile memory.

4. The system of claim 1, wherein the alternating pairs of structure pointers comprise a first pair of structure pointers and a second pair of structure pointers.

5. The system of claim 4, wherein the first pair of structure pointers comprises:
a first pointer associated with a first memory address corresponding to a first obsolete region and a first region size corresponding to the first obsolete region; and
a second pointer associated with a second memory address corresponding to a first valid region and a second region size corresponding to the first valid region.

6. The system of claim 4, wherein the second pair of structure pointers comprises:
a third pointer associated with a third memory address; and
a fourth pointer associated with a fourth memory address.

7. The system of claim 6, wherein the fourth memory address corresponds to at least a portion of a second valid region and the third memory address corresponds to the second memory address.

8. The system of claim 1, wherein the movement of valid variables and valid regions within the memory buffer identically corresponds to the movement of valid variables and valid regions within the non-volatile memory.

9. The system of claim 1, wherein the plurality of valid and obsolete variables stored in the plurality of valid and obsolete regions within the memory buffer is identical to the plurality of valid and obsolete variables stored in the plurality of valid and obsolete regions within the non-volatile memory subsequent to completion of a garbage collection process.

10. A method comprising:
searching a memory buffer for obsolete variables regions;
searching the memory buffer for valid variables regions that neighbor the obsolete variables regions;
writing valid variables from the valid variables regions to the obsolete variables regions until all of the obsolete variables regions have been overwritten with the valid variables; and
tracking the performance of the writing using alternating pairs of structure pointers to indicate at least portions of the obsolete and valid variables regions indicative of from where and to where the valid variables move during the writing.

11. The method of claim 10, wherein the tracking is recorded on a journal record resident on a non-volatile memory unit, wherein contents of the journal record are cached in the memory buffer.

12. The method of claim 11, wherein the writing of the valid variables from the valid variables regions to the obsolete variables regions identically corresponds to the writing of the valid variables from the valid variables regions to the obsolete variables regions within the non-volatile memory unit.

13. The method of claim 10, wherein the alternating pairs of structure pointers comprise a first pair of structure pointers and a second pair of structure pointers.

14. A computer program product, embodied on a non-transitory computer-readable medium, comprising:
computer code for searching a memory buffer for obsolete variables regions;
computer code for searching the memory buffer for valid variables regions that neighbor the obsolete variables regions;
computer code for writing valid variables from the valid variables regions to the obsolete variables regions until all of the obsolete variables regions have been overwritten with the valid variables; and
computer code for tracking the performance of the writing using alternating pairs of structure pointers to indicate at least portions of the obsolete and valid variables regions indicative of from where and to where the valid variables move during the writing.

15. The computer program product of claim 14, wherein the computer code for tracking further comprises computer code for recording the alternating pairs of structure pointers on a journal record resident on a non-volatile memory unit, wherein contents of the journal record are cached in the memory buffer.

* * * * *